United States Patent
Sheehan

(10) Patent No.: US 11,293,107 B2
(45) Date of Patent: Apr. 5, 2022

(54) SYSTEMS AND METHODS FOR VARIABLE PRESSURE ELECTROCHEMICAL CARBON DIOXIDE REDUCTION

(71) Applicant: Stafford Wheeler Sheehan, Tiverton, RI (US)

(72) Inventor: Stafford Wheeler Sheehan, Tiverton, RI (US)

(73) Assignee: AIR COMPANY HOLDINGS, INC., Brooklyn, NY (US)

( * ) Notice: Subject to any disclaimer, the term of this patent is extended or adjusted under 35 U.S.C. 154(b) by 397 days.

(21) Appl. No.: 16/383,373

(22) Filed: Apr. 12, 2019

(65) Prior Publication Data

US 2019/0233952 A1    Aug. 1, 2019

Related U.S. Application Data

(63) Continuation of application No. PCT/US2017/056589, filed on Oct. 13, 2017.
(Continued)

(51) Int. Cl.
*C25B 3/26* (2021.01)
*C25B 9/19* (2021.01)
(Continued)

(52) U.S. Cl.
CPC ............... *C25B 3/25* (2021.01); *C12G 3/00* (2013.01); *C12G 3/04* (2013.01); *C25B 9/00* (2013.01); *C25B 9/77* (2021.01); *C25B 15/08* (2013.01)

(58) Field of Classification Search
CPC ............ C25B 3/26; C25B 9/19; C25B 15/08
(Continued)

(56) References Cited

U.S. PATENT DOCUMENTS

| | | | |
|---|---|---|---|
| 2014/0027303 A1 | 1/2014 | Cole et al. | |
| 2016/0108530 A1* | 4/2016 | Masel | H01M 8/1025 |
| | | | 204/265 |
| 2018/0202056 A1* | 7/2018 | Park | B01D 53/965 |

FOREIGN PATENT DOCUMENTS

| | | |
|---|---|---|
| MD | 2075 B1 | 1/2003 |
| UA | 48701 C2 | 2/2006 |

OTHER PUBLICATIONS

Ralph, "Proton Exchange Membrane Fuel Cells," Platinum Metals Review (Jul. 1, 1997), vol. 41, pp. 102-113. (Year: 1997).*
(Continued)

*Primary Examiner* — Edna Wong
(74) *Attorney, Agent, or Firm* — Lucas Watkins; Benjamin Vaughan; Foley Hoag LLP

(57) ABSTRACT

Electrochemical devices, such as membrane electrode assemblies and electrochemical reactors, are described herein, as well as and methods for the conversion of reactants such as carbon dioxide to value-added products such as ethanol. In certain aspects, the membrane electrode assemblies are configured to allow for distributed pressure along the cathodic side of a membrane electrode assembly is described. The pressure vessel acts as a cathode chamber, both for the feed of reactant carbon dioxide as well as collection of products. The designs described herein improves the safety of high pressure electrochemical carbon dioxide reduction and allows for varied pressures to be used, in order to optimize reaction conditions. Configurations optimized for producing preferred products, such as ethanol, are also described.

8 Claims, 8 Drawing Sheets

Related U.S. Application Data

(60) Provisional application No. 62/468,676, filed on Mar. 8, 2017, provisional application No. 62/433,828, filed on Dec. 14, 2016, provisional application No. 62/408,172, filed on Oct. 14, 2016.

(51) Int. Cl.
- *C25B 15/08* (2006.01)
- *C25B 3/25* (2021.01)
- *C12G 3/04* (2019.01)
- *C12G 3/00* (2019.01)
- *C25B 9/00* (2021.01)
- *C25B 9/77* (2021.01)

(58) Field of Classification Search
USPC .................................. 204/263; 205/334, 450
See application file for complete search history.

(56) References Cited

OTHER PUBLICATIONS

LaConti et al., "Electrochemical Reduction of Carbon Dioxide," United Technologies Corp Farmington CT Hamilton Standard Div (May 1, 1986), pp. 1-36. (Year: 1986).*

Kraglund et al., "Zero-Gap Alkaline Water Electrolysis Using Ion-Solvating Polymer Electrolyte Membranes at Reduced KOH Concentrations," Journal of The Electrochemical Society (Jul. 2, 20161), vol. 163, No. 11, pp. F3125-F3131. (Year: 2016).*

Shironita et al., "CO2 Reduction at Platinum-Based Electrocatalyst Using Membrane Electrode Assembly," (Nov. 2013), vol. 2, No. 6, pp. 1-6. (Year: 2013).*

Kriescher et al., "A Membrane Electrode Assembly for the Electrochemical Synthesis of Hydrocarbons from CO2 (g) and H2O (g)," Electrochemistry Communications (Jan. 1, 2015), vol. 50, pp. 64-68. (Year: 2015).*

Aeshala et al., "Effect of Solid Polymer Electrolyte on Electrochemical Reduction of CO2," Separation and Purification Technology (Jun. 19, 2012), vol. 94, pp. 131-137. (Year: 2012).*

Aydin et al., "Electrochemical Reduction of Carbondioxide on Polypyrrole Coated Copper Electro-Catalyst Under Ambient and High Pressure in Methanol," Applied Catalysis B: Environmental (Aug. 1, 2013), vol. 140, pp. 478-482. (Year: 2013).*

International Search Report and Written Opinion for International Application No. PCT/US2017/056589 dated Jan. 31, 2018.

Kutz et al., "Sustainion™ Imidazolium Functionalized Polymers for CO2 Electrolysis," Energy Technol, 5: 929-936 (2017).

Abbott et al., "Electrochemical Reduction of CO2 in a Mixed Supercritical Fluid," J Phys Chem B, 104: 775-779 (2000).

Hara et al., "Electrochemical Reduction of Carbon Dioxide Under High Pressure on Various Electrodes in an Aqueous Electrolyte," J Electroanal Chem, 391: 141-147 (1995).

Hara et al., "Large Current Density CO2 Reduction Under High Pressure Using Gas Diffusion Electrodes," Bull Chem Soc Jpn, 70: 571-576 (1997).

* cited by examiner

SYSTEMS AND METHODS FOR VARIABLE PRESSURE ELECTROCHEMICAL CARBON DIOXIDE REDUCTION

REFERENCE TO RELATED APPLICATIONS

This application is a continuation of International Patent Application No. PCT/US2017/056589, filed Oct. 13, 2017, which claims the benefit of U.S. Provisional Patent Application No. 62/408,172, filed Oct. 14, 2016, U.S. Provisional Patent Application No. 62/433,828, filed Dec. 14, 2016, and U.S. Provisional Patent Application No. 62/468,676, filed Mar. 8, 2017, the contents of each of which are fully incorporated by reference herein in their entireties.

BACKGROUND OF THE INVENTION

Plants use photosynthesis to convert carbon dioxide, water, and solar energy into chemical energy by creating sugars and other complex hydrocarbons. This effectively stores the energy in absorbed photons from the sun in the chemical bonds of a carbon-based compound. This process has been supporting the Earth's ecosystem and balancing carbon dioxide concentration in our atmosphere for billions of years, and humans use this process to grow crops for food and chemical production.

In the last century, human beings have harnessed byproducts of photosynthesis, such as fossil fuels, to provide the energy required for modern life. Since the industrial revolution, human activity has released millions of tons of carbon dioxide into the Earth's atmosphere. To counteract these emissions, researchers have been attempting to find processes that can sequester carbon dioxide into the chemical bonds of carbon-based compounds. However, methods of efficiently transforming carbon dioxide into useful chemicals are still needed.

SUMMARY OF THE INVENTION

In certain aspects, the present disclosure provides an electrode assembly comprising an anode endplate; a cathode endplate; a polymer electrolyte membrane having a cathodic side and an anodic side disposed between the anode endplate and the cathode endplate; and a cathode catalyst disposed on the cathodic side of the polymer electrolyte membrane; wherein the cathode endplate is configured to allow the cathodic side of the polymer electrolyte membrane to be in fluid communication with a fluid surrounding the electrode assembly In certain aspects, the present disclosure provides an electrochemical reactor, comprising a pressure vessel; an electrode stack comprising one or more electrode assemblies; wherein the cathodic side of the polymer electrolyte membrane is open to the atmosphere of the pressure vessel.

In certain aspects, the present disclosure provides a method for electrochemical reduction of carbon dioxide using an electrode assembly or an electrochemical reactor comprising an electrode assemble, comprising supplying a catholyte comprising $CO_2$ to the cathodic side of the polymer electrolyte membrane; supplying an anolyte comprising water to the anodic side of the polymer electrolyte membrane; and applying a voltage between the anode endplate and the cathode endplate, thereby reducing the $CO_2$ to a $CO_2$ reduction product. In certain embodiments, the reduction product comprises ethanol.

In certain aspects, the present disclosure provides a method for producing an alcoholic beverage, comprising mixing ethanol produced by the above methods with a beverage ingredient.

DETAILED DESCRIPTION OF THE INVENTION

Figure 1:
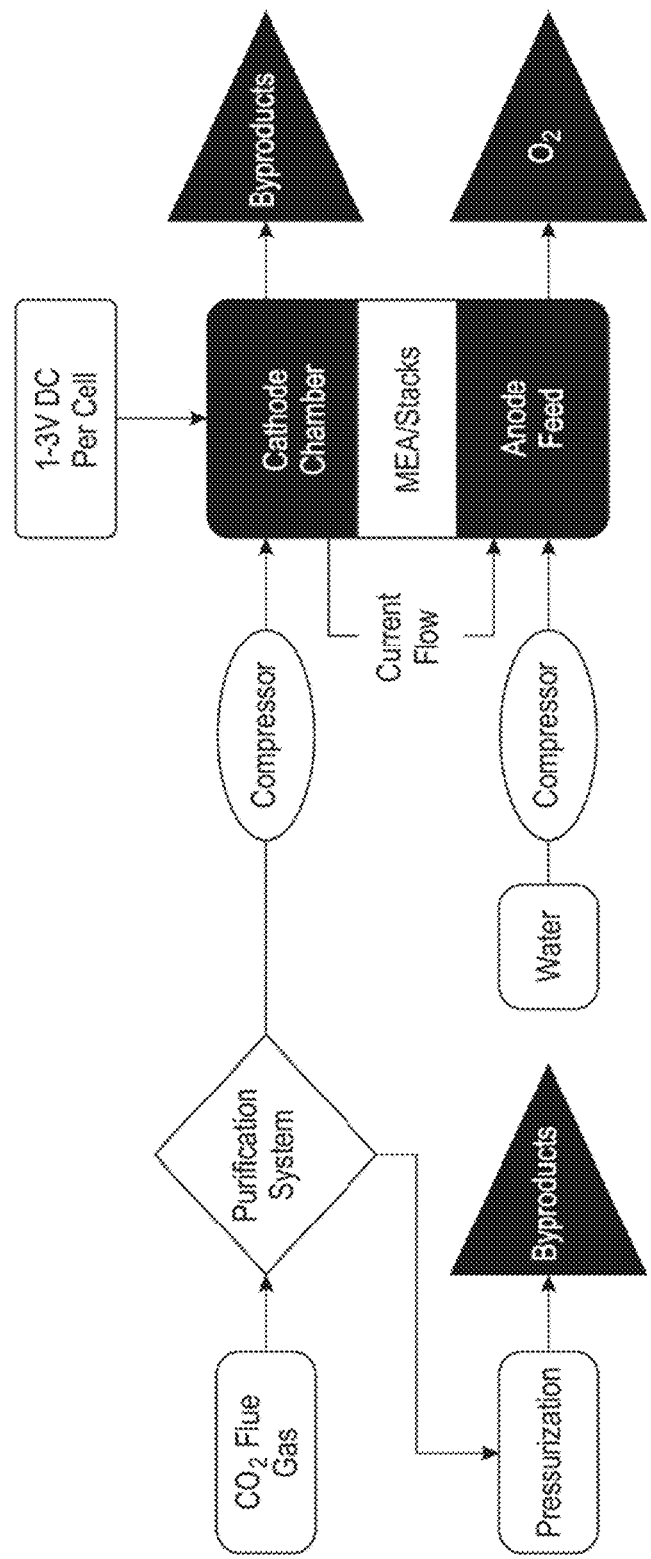
FIG. 1 shows a simplified flow diagram for the case of flue gas emissions from a coal-fired power plant in a $CO_2$ reduction process. First, flue gas is purified to remove soot and potential catalyst poisons or membrane fouling agents. It is then fed into the cathode chamber of an electrochemical system, where it is combined with protons supplied via the water oxidation half reaction and electrons from a DC power source to form the products.

The present disclosure provides apparatus and methods for reducing carbon dioxide to carbon dioxide reduction products. In general form, the reaction that takes place is:

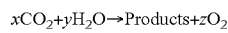

Where x, y, z are stoichiometric coefficients and are dependent on the products being made by the carbon dioxide reduction reaction. Common products of this reaction include, but are not limited to, CO, $HCO_2H$, HCHO, $CH_3OH$, $CH_4$, $CH_3CH_2OH$, $CH_3CH_3$.

Electrocatalytic carbon dioxide reduction operates using electricity as the energy source to drive the reduction of carbon dioxide at a cathode, coupled with an anodic half-reaction that provides electrons and protons required to reduce carbon dioxide. The oxidative process at the anode is typically water oxidation, similar to what takes place in plants, and can rapidly liberate four protons and four electrons per molecule of oxygen generated. The oxidative half-reaction is not limited to this, however, and can include carbon-hydrogen bond oxidation reactions which provide protons and electrons with a lower energy requirement than water oxidation.

Electrocatalytic carbon dioxide reduction has the advantage of being tunable in both its rate and selectivity, by changing the electrocatalyst present, reaction conditions, or by varying electrode potentials. Key among these advantages is the potential to identify process parameters that deliver selectivity for various desired organic compounds, such as ethanol. High selectivity for a desired compound allows for synthetic purity and targeted generation of a value-added product as is required for economic deployment of this technology. Furthermore, flexibility in the choice of electrolyte and proton source can be used to minimize the overall consumption of chemicals. Lastly, electricity used to drive this process can be obtained from renewable resources that do not generate additional carbon dioxide, allowing for a truly carbon-negative solution to our increasing carbon dioxide emissions.

With electrocatalytic carbon dioxide reduction, carbon dioxide effluent streams can be used as a feedstock for the generation of value-added chemicals which reduces their impact on the Earth's atmosphere. One major source of anthropogenic carbon dioxide is flue gas effluent from coal and natural gas power plants. Flue gas is not solely carbon dioxide and in many cases is between 5% and 50% carbon dioxide or more, depending on the process. It furthermore consists of combustion byproducts including nitrous oxide and soot. It is generated on massive scales at power plants, therefore it is desirable for a carbon dioxide reduction device that can both operate at high selectivity for carbon dioxide and at high rates of reaction. To date, the only electrocatalytic carbon dioxide systems that have been able to operate at these rates operate under high pressure. Therefore, there is a need for new architectures of high pressure carbon dioxide reduction systems that are scalable and able to operate under varied pressures so that the optimum conditions can be found and achieved on industrial scales for certain catalyst materials.

To circumvent the use of fermentation processes for ethanol, we can use electrolyzers. In these systems, ethanol can be generated from carbon dioxide, water and electricity. This allows for a concentration and purity of ethanol is much larger than is accessible to yeast organism in the final product. It also allows for direct, single-step generation of ethanol from carbon dioxide, rather than requiring the two-step process wherein plants sequester carbon dioxide to form sugars, then the sugars are fermented to form ethanol.

Membrane Electrode Assembly

In certain aspects, the present disclosure provides membrane electrode assemblies (MEAs) useful for reducing carbon dioxide and selectively producing desired reduction products. An MEA as a whole has an anodic side and a cathodic side, and comprises an anode diffusion layer; a cathode diffusion layer; and a polymer electrolyte membrane (PEM) disposed between the anode diffusion layer and the cathode diffusion layer. When the MEA is in use, the anodic side of the MEA will be in contact with the anolyte, for instance water; and the cathodic side of the MEA will be in contact with the catholyte, for instance $CO_2$.

The MEA comprises a polymer electrolyte membrane (PEM), which has a first, or anodic, side and a second, or cathodic side. The PEM used in the MEA may be any PEM known in the art for use in conducting ionic species, such as protons. In some embodiments, the PEM is a is cationic ion-exchange membrane, such as perfluorosulfonic acid membrane such as Nafion®; a perfluorocarboxylic acid membrane such as Flemion®. In some embodiments, the PEM is an anionic ion-exchange membrane, such as an imidazolium-functionalized styrene polymer such as Sustainion™ (Kutz et al. (2016), Sustainion™ Imidazolium Functionalized Polymers for $CO_2$ Electrolysis. Energy Technol. doi:10.1002/ente.201600636); or a sulfonated styrene divinyl benzene copolymer such as Selemion®.

The PEM may have a reactant-accessible surface area of 1 $cm^2$, 25 $cm^2$, 50 $cm^2$, 100 $cm^2$, 2,500 $cm^2$, 10,000 $cm^2$, and above.

Catalysts may be disposed on either side of the PEM, or on both sides. An anode catalyst may be disposed on the anodic side of the PEM. A cathode catalyst may be disposed on the cathodic side of the PEM. Many catalysts are known in the art, and catalysts suitable for the aims of the present disclosure are described herein. Catalysts may be applied to the PEM by methods known in the art, some of which are described herein.

A gas diffusion electrode (GDE) or gas diffusion layer (GDL) may be disposed on either side of the PEM, or on both sides. Such layers are known in the art to promote mass transport and electron transport to the catalyst, to help maintain similar partial pressures across the membrane, and to help prevent fouling of the membrane. Exemplary GDEs are described in U.S. Pat. Nos. 5,618,392 and 6,821,661. In some embodiments, a GDE may also function as a catalyst or co-catalyst. When a catalyst is disposed directly on the membrane, a catalyst-free GDL may be used. The GDL or GDE may comprise a conductive carbon-based material, such as carbon wool. The GDE may have a thickness of between 0.25 mm to 1.0 mm, for example 0.254 mm or 1.5 mm.

In some embodiments, the PEM is a part of a five-layer MEA, comprising a cathode catalyst, a cathode GDE or GDL, the PEM, an anode GDE or GDL, and an anode catalyst.

Electrochemical Cells

In some embodiments, the present disclosure provides electrochemical cells useful for reducing carbon dioxide and selectively producing desired reduction products, comprising an MEA, a cathode endplate, and an anode endplate. The endplates of the electrochemical cell are configured to transfer charge and provide reactant access to the MEA. The cathode endplate is configured to provide catholyte to the cathodic side of the MEA. The anode endplate is configured to provide anolyte to the anodic side of the MEA. The endplates may comprise carbon, a metal or metals such as copper or titanium, or any other suitable materials.

Reactants may be provided by directed flow along the membrane, or by allowing open channels between the exterior of the MEA and the membrane. When the reactant is provided by directed flow, the flow pattern may be any suitable flow pattern, for instance parallel, serpentine, or labyrinthine, and the endplate preferably comprises access points for reactant to be supplied at a sufficient pressure to flow through the directed flow channels. Directed flow systems generally involve a pressure drop along the direction of the flow, which ensures a sufficient velocity of reactant across the membrane.

When the reactant is provided by open channels in the endplate, the endplate is configured such that the MEA is in direct fluid communication with the atmosphere surrounding the MEA. In such a configuration, the channels in the endplate are preferably wide enough to allow diffusion or flow through the channels and across the membrane without an appreciable pressure drop or pressure variation, and to allow for collection of liquid products. This is advantageous, because many electrochemical reactions involving gaseous species (such as $CO_2$) are pressure sensitive, in that the Faradaic efficiency or the selectivity of the reaction for one product or another depends in large part on the pressure at the location where the reaction is taking place. Providing a pressure-sensitive reactant to the membrane at a constant, or approximately constant, pressure across the entire membrane allows the operating pressures for those reactants to be tuned to optimize reaction conditions. When the endplate is open so that the atmosphere surrounding the electrochemical cell can access the MEA, reactants can be provided to the membrane by diffusion, or by slow, non-directed circulation as would be provided by a fan or by convection. In some embodiments, waste heat generated by the operation of the MEA may provide the convection. By contrast, directed flow systems operate with pressure drops along the flow field that can cause inconsistent selectivity for reduction products between the start of the flow field and the end of the flow field.

The channels may also be configured to allow for collection of liquid products. Mass transport is easier when the endplate is open to the atmosphere surrounding the electrochemical cell. In some embodiments, the channels of the endplate are of non-uniform depth, i.e., their floors are angled. This allows a liquid $CO_2$ reduction product to drip off of the endplate to a collection pool below the electrochemical cell. In some embodiments, the channels can be configured with a constant (linear) angle. Additionally, or alternatively, the channels can be configured with an undulating pattern of local peaks and troughs to provide a plurality of dripping locations for collection of the $CO_2$ reduction product. The channel geometry can be consistent throughout an entire stack, or varied as desired. For example, a gradient of channel density can be employed in which channels at the bottom of a given stack are formed wider than channels at the top of the stack.

In preferred embodiments, the electrochemical cell is configured such that the catholyte, such as $CO_2$, can be provided to the cathodic side of the MEA without appreciable pressure variation across the MEA, i.e., at constant or approximately constant pressure (i.e., substantially uniform pressure) across the MEA. Preferably, the cathode endplate comprises channels that place the cathodic side of the membrane in open fluid communication with the atmosphere surrounding the MEA, such as the atmosphere in a pressure vessel. The channels may have varied aspect ratios. The channels may be parallel, may be a circular design, or may form a grid pattern. In some embodiments, the channels run straight across the endplate, and are present at a cross-sectional density of at least 1 channel per cm, preferably 2-3 channels per cm. In some embodiments, the channels have a width of 0.1-1 cm, preferably about 0.2 cm. In some embodiments, the channels have an aspect ratio of 0.1-10, preferably 0.5. In some embodiments, there are at least 5 channels per endplate, at least 8 channels per endplate, or at least 10 channels per endplate. In some embodiments, the channels are tapered.

Open-channel endplates as described herein also allow electrochemical cells to be stacked more easily. For instance, the electrochemical cells described herein can be put into stacks with bipolar plates connecting individual MEAs, rather than using many monopolar plates. In such a configuration, one bipolar plate may simultaneously serve as the cathode endplate for one electrochemical cell and the anode endplate for the next electrochemical cell. Monopolar plates may also be used with the MEAs described herein.

Figure 4:
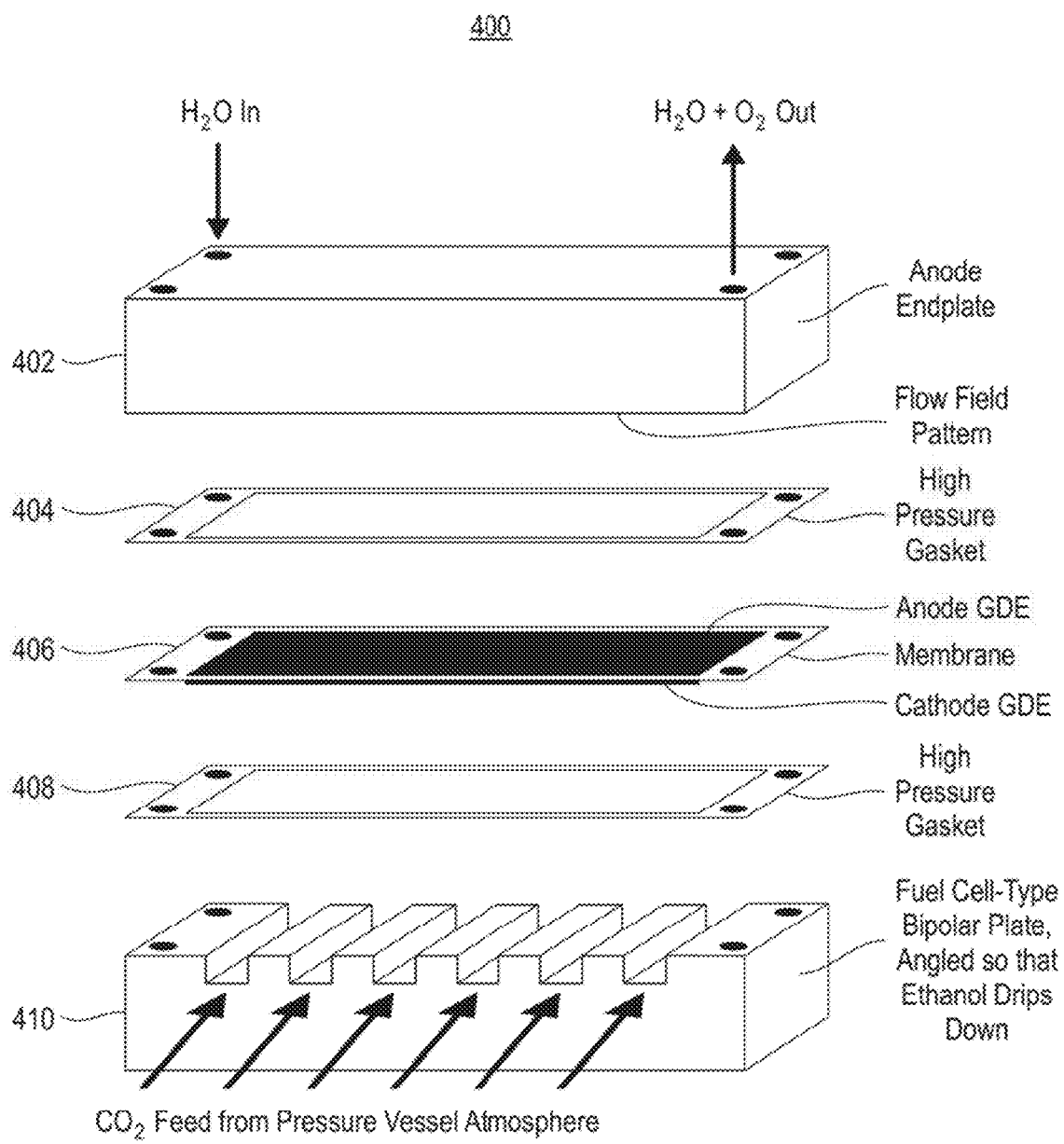
FIG. 4 shows the internal configuration of an electrolysis unit in which the cathode side of the membrane is open to the atmosphere of the pressure vessel. The channels in the cathode endplate are open to allow $CO_2$ to reach the membrane by diffusion, or by flowing through the channels at a very low pressure drop, as could be caused by a low-power fan.
Figure 5:
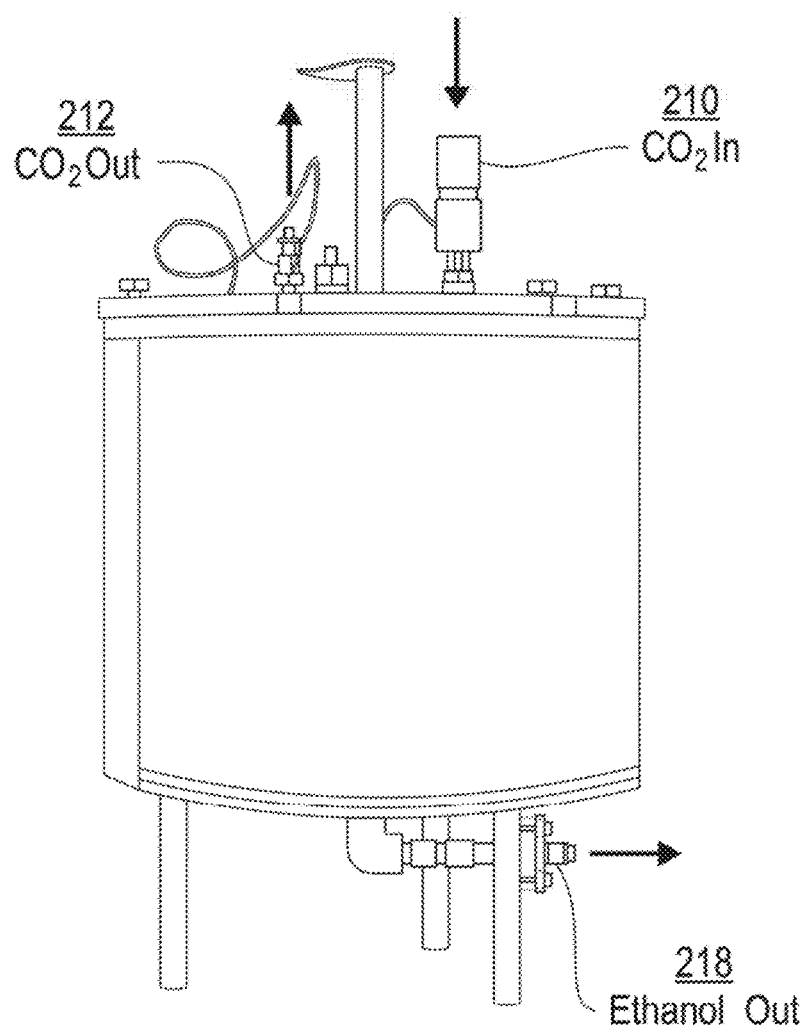
FIG. 5 shows an external view of an exemplary reactor that uses high pressure carbon dioxide as a reactant to produce ethanol.
Figure 6:
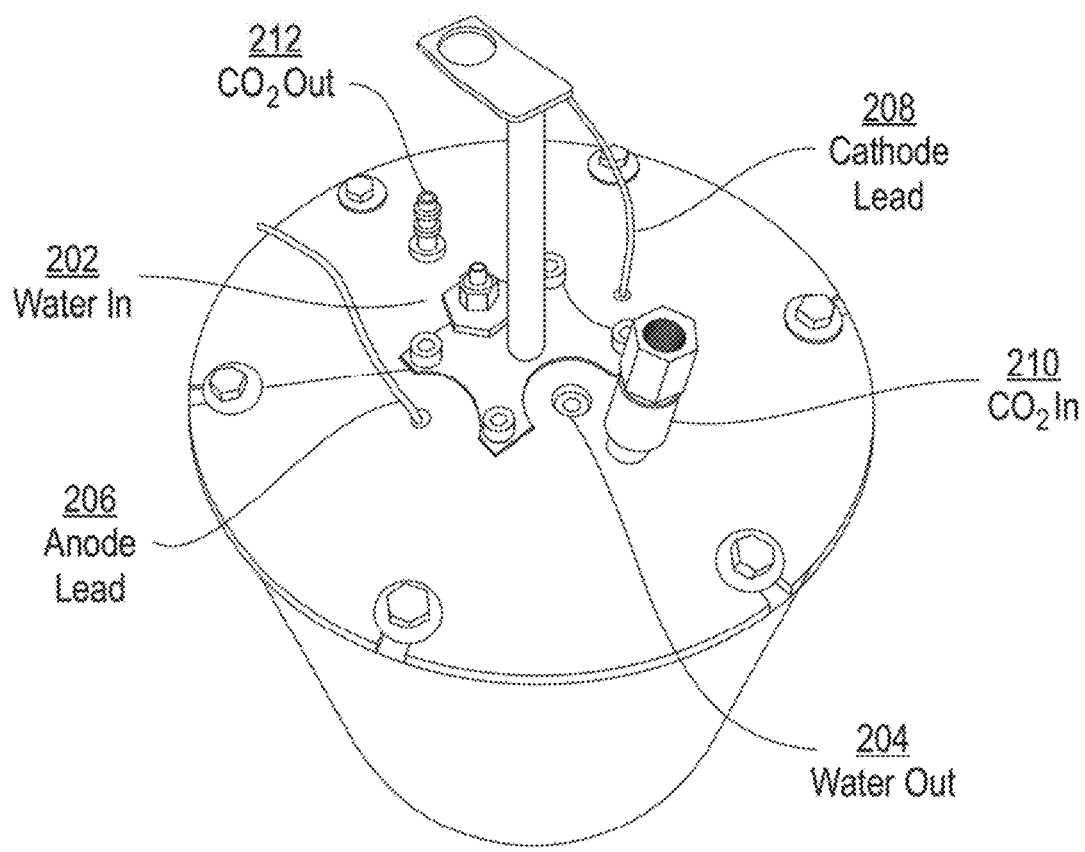
FIG. 6 shows an external view of the lid of an exemplary reactor, where the reactants carbon dioxide and water are fed in and positive and negative terminals for the cathode and anode are provided for connection with a DC power source.
Figure 7:
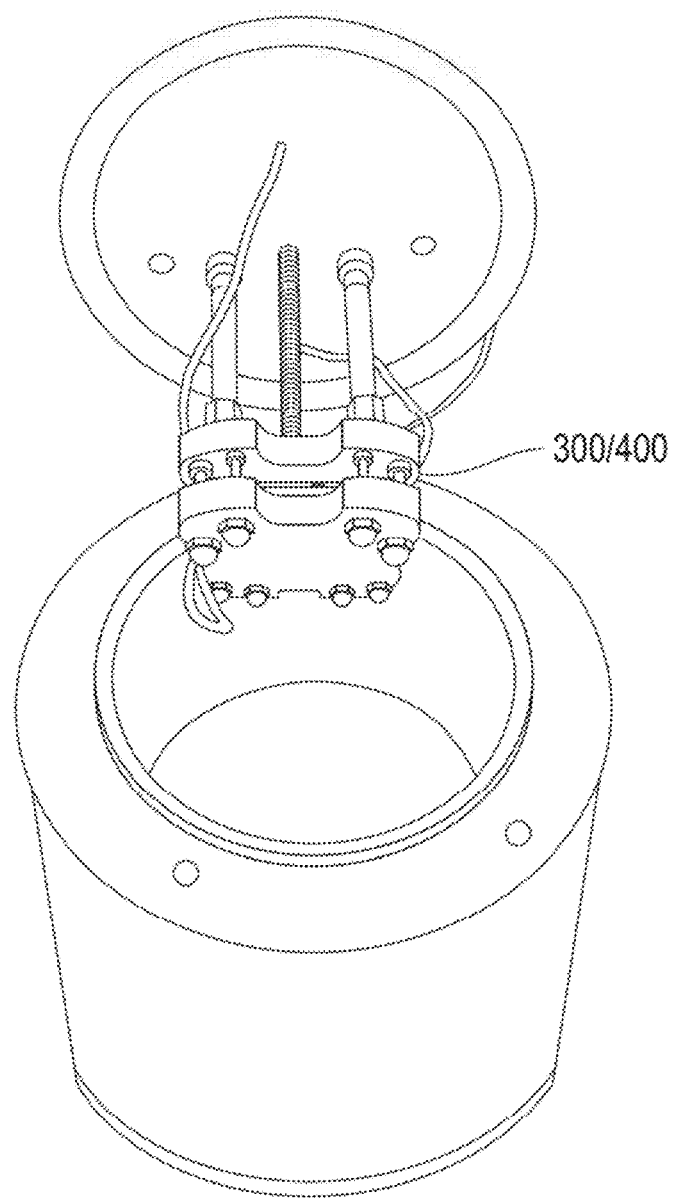
FIG. 7 shows a view of the inside of an exemplary reactor, which contains an electrolysis unit having the internal configuration depicted in FIG. 4 and an outlet through with ethanol product can be collected.
Figure 8:
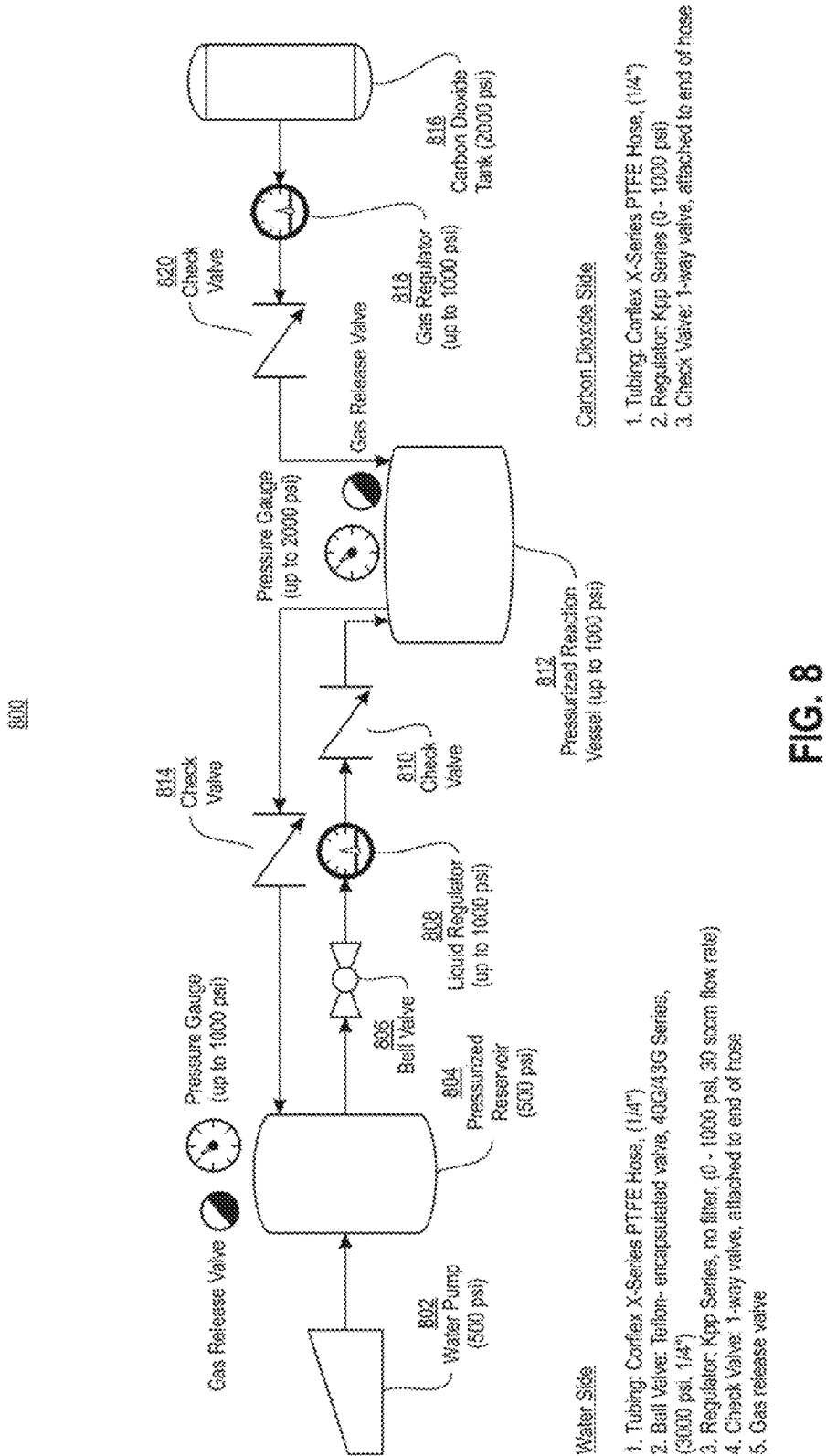
FIG. 8 shows the peripheral systems around the reactor that support the high pressures on either side of the membrane. Carbon dioxide is fed directly into the system, while water is recirculated in an external loop to ensure consistent pressure across the anode flow plate.

In some embodiments, the electrochemical cell further comprises high-pressure gaskets disposed between the MEA and the cathode and/or anode endplates. Depending on the materials comprising the membrane and the endplates, such gaskets may be necessary to allow the desired pressure variations between the two sides of the MEA, or to contain a directed flow reactant on one side or the other of the MEA. The gaskets can be formed as discrete members spaced between adjacent components, or integrally coupled to an end of a component (e.g. MEA or endplate). In some embodiments the membranes can be formed as a mask having a boundary defining an opening or window which overlies the MEA, with the boundary portion coinciding with the perimeter of the endplates, as shown in FIG. 4. Furthermore, the gaskets ensure that appropriate contact is made between the flow plates and the MEA for efficient current flow.

The electrochemical cells, MEAs, and PEMs of the present disclosure are able to withstand pressure differences between anolyte and catholyte of up to 50 psi, 100 psi, or 250 psi, preferably 500 psi, 750 psi, or 1000 psi. Many electrochemical reactions involving gaseous species (such as $CO_2$) are known to be pressure sensitive, in that the Faradaic efficiency or the selectivity of the reaction for one product or another depends on the pressure. The tolerance of the MEA to pressure differences between anolyte and catholyte allow the operating pressures for those reactants to be selected independently to optimize reaction conditions.

The electrochemical reactions performed at the MEA in operation are two individual half-reactions. An exemplary anolyte is water. Water may be oxidized at the anode to form oxygen gas, protons, and electrons. The oxygen gas is released as a byproduct, the protons travel through the PEM portion of the MEA, and the electrons travel through an external circuit where a voltage is applied to increase the energy of the electrons. An exemplary catholyte is $CO_2$. $CO_2$ is reduced at the cathode and (when water is the anolyte) combines with protons generated by the water to form $CO_2$ reduction products. Other catholytes and anolytes may be used with the MEAs of the present invention to produce different products.

In order to drive the electrochemical reactions described herein, electrical contact must be made between each side of the MEA and a voltage source. In some embodiments, contact will be made between the MEA and the external circuit by a conductive flow plate. In some cases, the flow plate is an endplate that then contacts with a current collector. When electrons travel from the MEA anode into the flow plate, then to the anodic current collector, they are fed into the external circuit, which includes a voltage source, and can then be utilized for the thermodynamically uphill reduction of carbon dioxide to a product, such as ethanol, by being fed into the cathodic current collector, traversing the cathodic endplate, and being fed into the cathode catalyst on the opposite side of the MEA.

In some embodiments, the endplate used in an MEA will be a bipolar plate that also serves as the opposite endplate for a different MEA. Thus, the same physical component may serve as the cathode endplate of one electrochemical cell and the anode endplate of an adjacent electrochemical cell. An individual MEA and its adjacent flow plates, are denoted as an "electrochemical cell" or "electrolyzer cell". The MEAs may thus be combined into stacks.

Reactor Configuration

In certain aspects, the present disclosure provides electrochemical reactors comprising one or more electrochemical cells (the MEAs and their associated flow plates) as described herein. In some embodiments, the reactor comprises a pressure vessel, and the one or more MEAs are disposed within the pressure vessel. In some embodiments, the pressure vessel is able to withstand variable pressures up to 10 psi, 100 psi, 500 psi, 1000 psi, 1500 psi, 2000, psi, 3000 psi, and higher. The entirety of the MEA stack, including the flow plates, MEAs, and required gaskets to maintain separation of fluids (gases, liquids, or supercritical fluids) under high pressure, sits inside the pressure vessel. The reaction may be run at any pressure suitable for the desired reaction. For instance, the fluid within the pressure vessel may be gaseous, liquid, or supercritical.

In some embodiments, the reactor comprises one or more stacks of MEAs, which may be connected to each other by bipolar plates as described herein.

In some embodiments, the reactor comprises heating or cooling elements, or is otherwise configured to regulate the temperature inside the reactor.

In some embodiments, the reactor comprises components to facilitate mass transport and/or product collection. In some embodiments, the reactor comprises a circulating fan to aid in circulation of a reactant throughout the reactor body and to the MEA(s). In some embodiments, the reactor comprises a product collection vessel. The vessel may be a component that is separate from, but fastened to, the inside of the reactor. Alternatively, the vessel may be integrally formed into the body of the reactor, for instance as a depression or bowl in the bottom of the reactor.

In some embodiments, the reactor is configured to allow the pressure to be adjusted or tuned to optimize the production of preferred products. In order to do so, as described above with respect to the MEAs, when the reactor is configured for $CO_2$ reduction, the cathode endplates are preferably configured to allow the atmosphere within the pressure vessel of the reactor to be in fluid communication with the cathodic side of the PEMs. This is in contrast to a configuration for directed flow, such as a serpentine flow pattern that requires a gas be fed through discrete and dedicated conduits. Having the cathode endplates open to the pressure vessel atmosphere allows for equalization of pressure across the cathode side of the MEA, as well as collection of certain liquid-phase products in the cathode chamber. Water can be fed into the anode side at similarly high pressures, or at a lower pressure, as long as the MEA is able to withstand the pressure difference.

In some embodiments, the reactor is configured to allow a catholyte, such as a catholyte comprising $CO_2$, to be fed in during operation. For example, the reactor may comprise fittings for catholyte input and catholyte output.

In some embodiments, the reactor is configured to allow an anolyte, such as a catholyte comprising water, to be fed in during operation. For example, the reactor may comprise fittings for anolyte input and anolyte output.

In some embodiments, the reactor is configured to allow a product, such as ethanol, to be removed during operation. For example, the reactor may comprise a fitting, such as a spigot that allows products to be collected during reactor operation, i.e., without stopping the electrochemical reaction or appreciably lowering the pressure within the reactor.

In some embodiments, the reactor comprises a high-pressure water recirculation system, or a fitting adapted to connect to a high-pressure water circulation system. Such a high-pressure water circulation system may be used with the reactor in addition to a carbon dioxide feed. The water loop allows better control and uniformity of pressure across the anode flow plate.

One advantage of electrolyzing carbon dioxide and water into products using the reactors of the present disclosure is that the pressure in the cathode chamber can be easily varied using a compressor or other external pressure control system, which can allow the operator to adjust the rate of reaction and/or the selectivity of the reaction. Since the anode is supplied with water, which possesses a density much higher than that of gaseous carbon dioxide at standard pressure, the proton-generating water oxidation reaction is not rate-limiting. By varying the carbon dioxide pressure, and thereby its chemical state from gas, to liquid, and to supercritical fluid in a safe and distributed manner using the cathode chamber design reaction rates and conditions can easily be improved.

Product Selectivity

In some embodiments, the product of carbon dioxide reduction reaction may be ethanol, methanol, propanol, methane, ethane, propane, formic acid, ethylene glycol, acetic acid, ethylene, butanol, butane, and long-chain hydrocarbons such as octanol, decanol, and cyclooctane. In some embodiments, the product of carbon dioxide reduction is ethanol. Use of an appropriate cathode catalyst enables selectivity for ethanol and reduced production of the byproducts.

If a catalyst is employed at the anode or cathode, the identity of the catalyst will affect the selectivity of the reaction that takes place.

In some embodiments, a cathodic catalyst is disposed on the PEM or within a GDE that is disposed on the PEM. The cathodic catalyst may comprise a copper-containing catalyst, such as copper metal or copper oxide nanoparticles/nanostructures, a ruthenium-containing catalyst, a rhenium-containing catalyst, an iron-containing catalyst, a manganese-containing catalyst, or any mixture of transition metals with the above. In some embodiments, the cathode catalyst comprises a metal oxide, and in others, the cathode catalyst comprises a molecular species. In some embodiments, the catalyst comprises a transition metal compound, such as a first-row transition metal oxide. In some embodiments, the cathode catalyst comprises a rhenium rhodium, or ruthenium-containing compound. In some embodiments, the catalyst comprises copper oxide or a mixed metal oxide comprising copper oxide. In some embodiments, the cathodic catalyst further comprises an ionomer. In some embodiments, the cathodic catalyst further comprises binders.

In some embodiments, an anodic catalyst is disposed on the PEM or within a GDE that is disposed on the PEM. In some embodiments, the anode catalyst comprises iridium oxide, platinum, or an iridium-containing compound. In some embodiments, the anode catalyst comprises a transition metal or transition metal oxide, such as iridium oxide, platinum metal, ruthenium oxide, iridium ruthenium oxide, iridium-based molecular species, iron oxide, nickel oxide, or cobalt oxide. In some embodiments, the anode catalyst comprises nanoparticles comprising a transition metal or transition metal oxide, such as iridium oxide, platinum metal, ruthenium oxide, iridium ruthenium oxide, iridium-based molecular species, iron oxide, nickel oxide, or cobalt oxide. In some embodiments, the anodic catalyst further comprises an ionomer. In some embodiments, the anodic catalyst further comprises binders.

In some embodiments, a catalyst (either anodic or cathodic) is supported using a scaffold comprised of carbon, antimony-doped tin oxide, or tin-doped indium oxide.

The composition of the endplate can also affect the selectivity of the reaction that takes place. The endplates used in the MEAs of the present disclosure may be made of any materials that can withstand the conditions in the reactor, including the pressure differences, the charge transport, and the operating temperature. In some embodiments, an endplate comprises carbon, such as graphite. In some embodiments, an endplate comprises metal, such as copper. In some embodiments, copper endplates or copper-coated endplates (such as copper-plated titanium) may be used to promote the production of ethanol.

Feed Carbon Dioxide

In preferred embodiments, the catholyte comprises $CO_2$. Carbon dioxide comes in varied concentrations, between atmospheric (0.04%) and high purity carbon dioxide (99.99%). The present disclosure provides electrochemical reactors that can convert carbon dioxide streams that are at least 0.04%, 1%, 5%, 10%, 20%, 40%, 60%, 80%, 90%, 95%, 98%, 99% or higher carbon dioxide on a per-volume basis. Although the concentration can vary significantly, it is the partial pressure of $CO_2$ that primarily controls the selectivity and rate of the electrochemical reduction reaction.

The source of the $CO_2$ may be effluent from coal and natural gas fired power plants. Such effluent typically comes in the form of flue gas, which is a mixture of carbon dioxide, carbon monoxide, and other combustion products, produced on the scale of tons to thousands of tons per day. This requires a system that is able to operate using large volumes. In some embodiments of this invention, the carbon dioxide flue gas is purified or scrubbed of some of its more harmful contaminants or membrane fouling agents (such as fine particulates, e.g. soot) prior to being introduced to the electrochemical system. The resulting carbon dioxide stream may possess a lower percentage of aerosol particles, before being compressed to high pressure and introduced to the cathode chamber. A flow chart depicting an example of this process is shown in FIG. 1.

Figure 2:
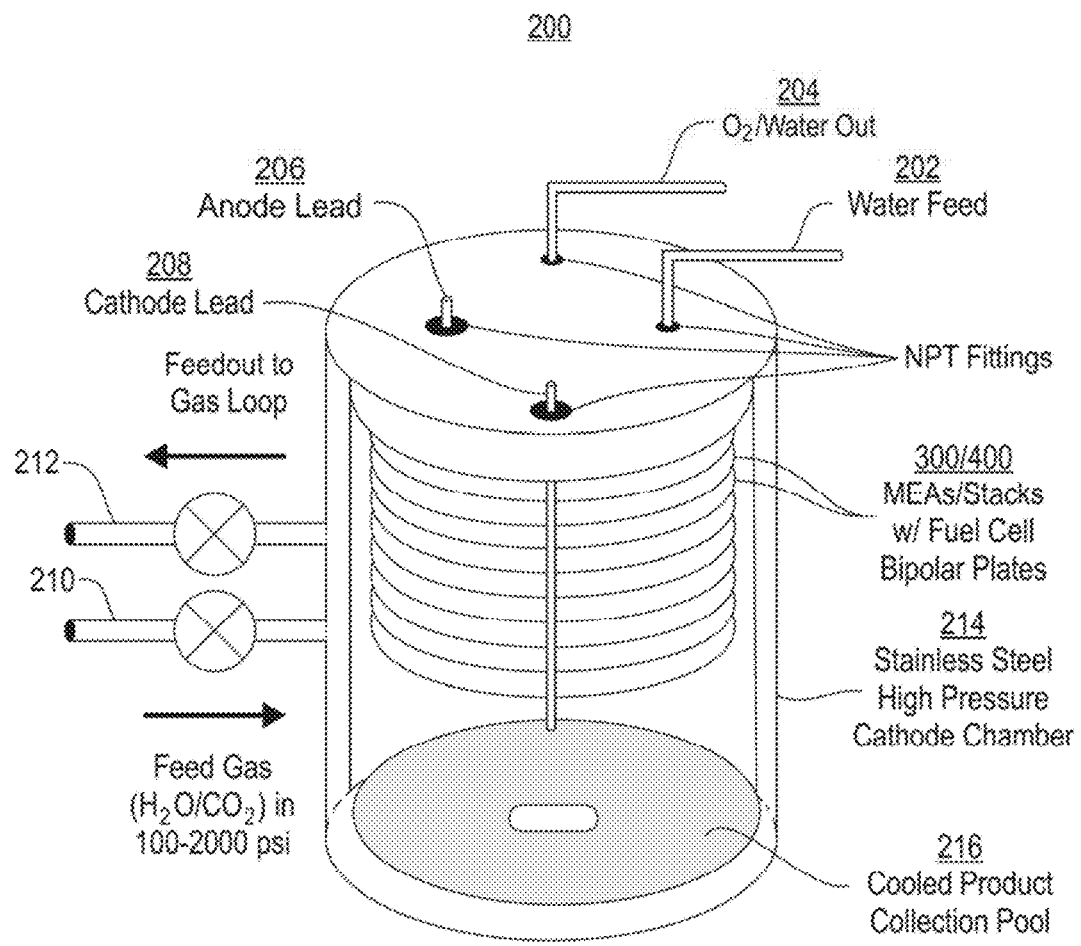
FIG. 2 shows one embodiment of an exemplary electrochemical system of the present disclosure, which includes an MEA stack with cathodes open to the pressure vessel and an anode feed that is not open to the pressure vessel. Carbon dioxide under high pressure is flowed into the cathode chamber, and may be moistened to assist membrane hydration and product formation at the MEAs. Variable temperature at the stacks (due to overpotential heat loss) and at the bottom of the pressure vessel allow for product collection.
Figure 3:
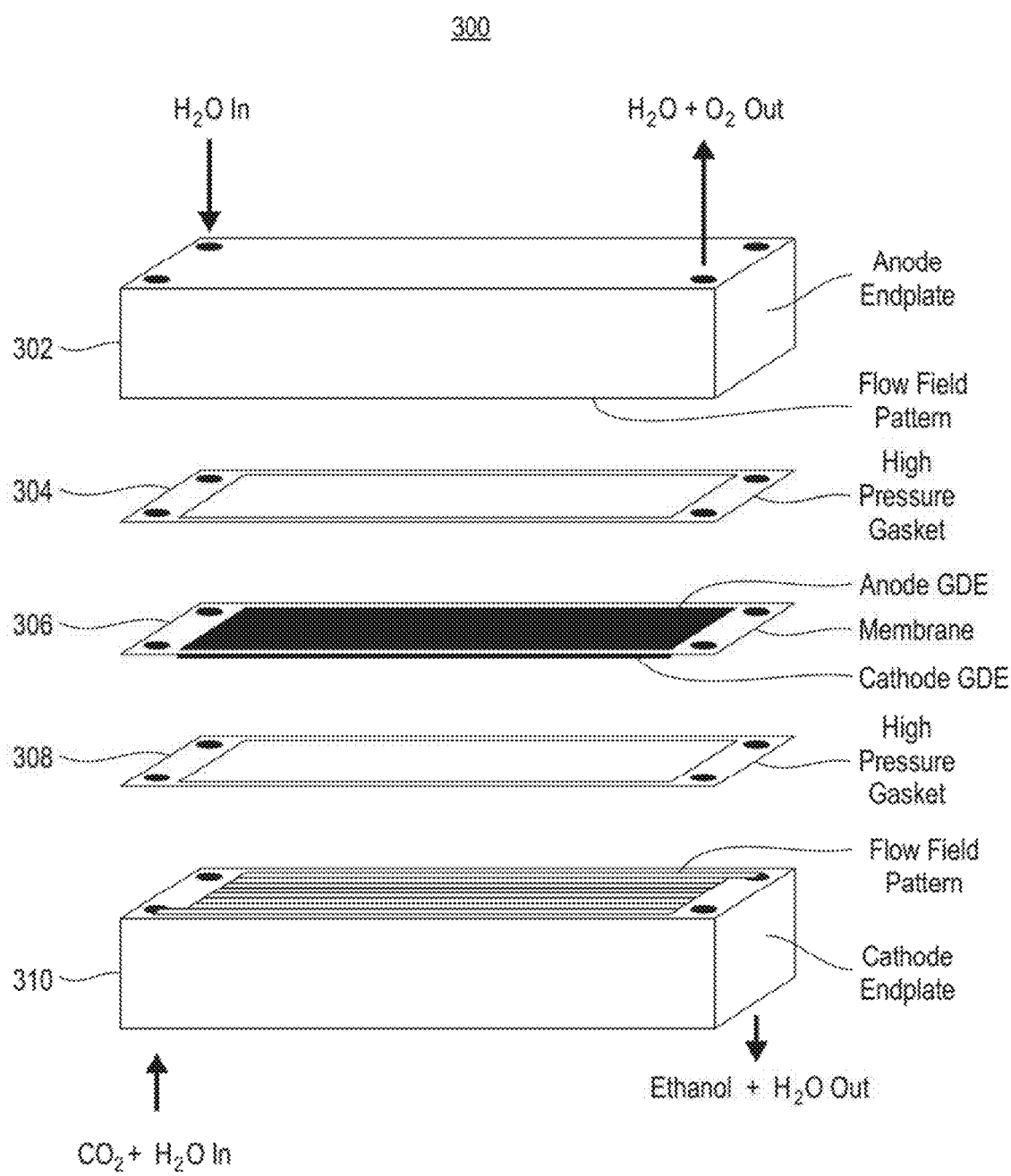
FIG. 3 shows the internal configuration of an individual MEA in an electrolyzer stack or electrolysis unit, showing individual components and how the feed reactants (water from the anode feed and moistened carbon dioxide from the cathode feed) can be transported to the anode and cathode gas diffusion layers and electrodes of the membrane electrode assembly by directed flow. The flow field patterns may be any pattern that maximizes contact between the anolyte (water) or catholyte (carbon dioxide) and the membrane electrode assembly and allows for transportation of products (oxygen gas, ethanol, and other byproducts) out of the system, such as a serpentine pattern or a parallel pattern.

In some embodiments of this invention, the feed carbon dioxide containing stream is compressed prior to introduction to the cathode chamber and electrolysis system. In others, it is liquefied using a thermal process. The present disclosure provides reactors and systems that can be configured for compatibility with atmospheric pressure gaseous carbon dioxide, high pressure gaseous carbon dioxide, high pressure liquid carbon dioxide, or all three. The variable pressure nature of these systems allow gaseous carbon dioxide, liquid carbon dioxide, liquefied flue gas, or any gaseous or liquid phase of a carbon-containing feed stream to be utilized. Furthermore, it is an object of the invention to feed this carbon-containing stream at variable pressures into a pressure vessel that also serves as a cathode chamber and houses the electrolyzer stacks, as shown in FIG. 2. In some embodiments, the pressure of the feed carbon dioxide may be 10 psi, 100 psi, 500 psi, 1000 psi, 1500 psi, 2000, psi, or 3000 psi. In some embodiments, the pressure of the feed carbon dioxide may be 10-3000 psi, 100-3000 psi, 500-3000 psi, 1000-3000 psi, 1500-3000 psi, 2000-3000, psi, or about 3000 psi.

In some embodiments, the feed carbon dioxide is moistened or otherwise mixed with water prior to introduction into the electrochemical reactor.

Methods for Producing Carbon Dioxide Reduction Products

In certain aspects, the present disclosure provides methods for producing $CO_2$ reduction products using the MEAs and/or electrochemical reactors described here, comprising supplying a catholyte comprising $CO_2$ to the cathodic side of the polymer electrolyte membrane; supplying an anolyte comprising water to the anodic side of the polymer electrolyte membrane; and applying a voltage between the anode endplate and the cathode endplate, thereby reducing the $CO_2$ to a $CO_2$ reduction product which varies depending on the pressure, temperature, and voltage applied in the system.

Apparatus and Methods for Producing Ethanol

In certain aspects, the present disclosure provides apparatus for producing ethanol as a $CO_2$ reduction product, such as MEAs and electrochemical reactors. The overall reaction that occurs is the reduction of carbon dioxide to ethanol and oxidation of water to form oxygen.

This is shown in the reaction scheme below.

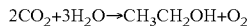

In electrochemical systems that are used for alcoholic beverage production, the major product of the carbon dioxide reduction reaction is ethanol. Common minor products of this reaction include, CO, $HCO_2H$, HCHO, $CH_3OH$, $CH_4$, $CH_3CH_3$.

In certain embodiments, the faradaic efficiency of the reduction reaction to form ethanol may be at least 20%, 40%, 60%, 80%, 90%, 95%, 98%, 99%, 99.5%, 99.9%, or higher with the presence of a suitable catalyst.

Preferred cathodic catalysts for the production of ethanol comprise copper oxide. In some preferred embodiments, the cathodic catalyst comprises copper oxide, copper oxide on a tin oxide support, or copper oxide nanoparticles.

Preferred cathodic endplates for the production of ethanol comprise a carbon allotrope or metal, even more preferably titanium, graphite, or copper. In some preferred embodiments, the cathodic endplate comprises 50%, 75%, 90%, or 99% copper or comprises a 92% titanium coated with copper.

Preferred pressure vessels and other apparatus for the production of ethanol can sustain cathodic pressures of at least 50, 100, 250, 500, 750, 1000, or 1500 psi.

In certain aspects, the present disclosure provides methods for producing ethanol by electrochemical reduction of $CO_2$ using the MEAs and/or electrochemical reactors described here, comprising supplying a catholyte comprising $CO_2$ to the cathodic side of the polymer electrolyte membrane; supplying an anolyte comprising water to the anodic side of the polymer electrolyte membrane; and applying a voltage between the anode endplate and the cathode endplate, thereby reducing the $CO_2$ to a $CO_2$ reduction product.

In certain embodiments, ethanol produced by the methods of the present disclosure is used for the production of alcoholic beverages containing ethanol. In most cases, ethanol or an ethanol and water mixture will be generated by the reactor. This resulting product may go through further purification or dilution to produce ethanol that is suitable for human consumption, and may then be mixed with another beverage ingredient, such as either water or an aqueous mixture of flavorings, to produce an alcoholic beverage that is at least 1%, 5%, 10%, 20%, 40%, 60%, 80%, 90%, 95%, 98%, 99% or higher alcohol content by volume.

EXEMPLIFICATION

The invention now being generally described, it will be more readily understood by reference to the following examples, which are included merely for purposes of illustration of certain aspects and embodiments of the present invention, and are not intended to limit the invention.

Example 1: Selectivity of Various Catalysts

A Nafion-based MEA was prepared with various metal oxide or molecular cathode layer catalysts layered on top of it. For each catalyst tested, an MEA stack was placed into a pressure vessel and sandwiched between either a graphite or copper cathode flow plate and a platinum-coated titanium anode flow plate. $CO_2$ was introduced into the reactor at pressures between 1000 and 1500 psi, and voltages were applied across the cell from a DC power source. The results of the reactions are listed in Table 1, where bpy=2,2'-bipyridine, and sb=surface bound to an antimony-doped tin oxide conductive support.

TABLE 1

Reaction Conditions for Various Catalysts

| Catalyst | Lifetime | Voltage (2-cell) | Current Density | Primary product (% yield) |
|---|---|---|---|---|
| Re(bpy)(CO)$_3$(sb) | <1 hour | 2.0 | 91 mA/cm$^2$ | Not Detectable |
| Copper Oxide | 7+ days | 2.1 | 786 mA/cm$^2$ | Ethanol (7%) |
| CuMn Mixed Oxide | 7+ days | 2.5 | 1.01 A/cm$^2$ | Formic Acid (71%) |
| CuFe Mixed Oxide | 34 hours | 2.1 | 402 mA/cm$^2$ | Methanol (3%) |

Example 2: Production of Ethanol Using Various Catalysts

Various Copper-based catalysts were tested for their capacity to catalyze the reduction of $CO_2$ to ethanol in a Nafion-based or Selemion-based MEA. For each tested catalyst, an MEA stack was placed into a pressure vessel sandwiched between a copper cathode flow plate and a platinum-coated titanium anode flow plate. $CO_2$ was introduced into the reactor at a pressure of approximately 1000 psi, and voltages were applied across the cell from a DC power source. The results are presented in Table 2, where the first two entries used a Nafion-based membrane and the last used a Selemion-based membrane.

| Catalyst | Lifetime | Voltage (2-cell) | Current Density | Primary product (% yield) |
|---|---|---|---|---|
| Copper oxide | 7+ days | 2.1 | 786 mA/cm$^2$ | Ethanol (7%) |
| Copper oxide on tin oxide support | 5 days | 2.1 | 572 mA/cm$^2$ | Ethanol (3%) |
| Copper oxide nanoparticles | 7+ days | 2.0 | 415 mA/cm$^2$ | Ethanol (45%) |

INCORPORATION BY REFERENCE

All publications and patents mentioned herein are hereby incorporated by reference in their entirety as if each individual publication or patent was specifically and individually indicated to be incorporated by reference. In case of conflict, the present application, including any definitions herein, will control.

EQUIVALENTS

Those skilled in the art will recognize, or be able to ascertain using no more than routine experimentation, numerous equivalents to the compounds and methods of use thereof described herein. Such equivalents are considered to be within the scope of this invention and are covered by the following claims. Those skilled in the art will also recognize that all combinations of embodiments described herein are within the scope of the invention.

The invention claimed is:

1. A method for electrochemical reduction of carbon dioxide using an electrochemical reactor comprising:
   an electrode assembly comprising:
     an anode endplate;
     a cathode endplate, wherein the cathode endplate comprises copper; and
     a polymer electrolyte membrane having a cathodic side and an anodic side disposed between the anode endplate and the cathode endplate; and
   a fluid surrounding the electrode assembly, wherein the fluid is a catholyte comprising $CO_2$;
   wherein the cathode endplate is configured to allow the cathodic side of the polymer electrolyte membrane to be in open fluid communication with the fluid;
   the method comprising:
     supplying the catholyte to the cathodic side of the polymer electrolyte membrane;
     supplying an anolyte comprising water to the anodic side of the polymer electrolyte membrane; and
     applying a voltage between the anode endplate and the cathode endplate, thereby reducing the $CO_2$ to a $CO_2$ reduction product.

2. The method of claim 1, wherein supplying the catholyte comprises supplying the catholyte at a pressure of at least 100 psi.

3. The method of claim 2, wherein the $CO_2$ in the catholyte has a partial pressure of at least 100 psi.

4. The method of claim 1, wherein the $CO_2$ reduction product comprises ethanol.

5. The method of claim 4, wherein the ethanol comprises at least 5 percent by volume of the $CO_2$ reduction product.

6. The method of claim 1, further comprising a cathode catalyst disposed on the cathodic side of the polymer electrolyte membrane.

7. The method of claim 1, wherein the electrochemical reactor further comprises a pressure vessel containing the fluid and the electrode assembly.

8. The method of claim 1, wherein the electrochemical reactor further comprises one or more additional electrode assemblies disposed within the pressure vessel.

* * * * *